United States Patent [19]

Föller et al.

[11] Patent Number: 4,586,655
[45] Date of Patent: May 6, 1986

[54] STEAM TRAP WITH THERMAL CONTROL ELEMENT AND METHOD OF ASSEMBLING SAID TRAP

[75] Inventors: Werner Föller, Stuhr; Holm Klann, Bremen, both of Fed. Rep. of Germany

[73] Assignee: GESTRA Aktiengesellschaft, Bremen, Fed. Rep. of Germany

[21] Appl. No.: 678,762

[22] Filed: Dec. 5, 1984

[30] Foreign Application Priority Data

Jan. 25, 1984 [DE] Fed. Rep. of Germany ....... 3402441
Jun. 15, 1984 [DE] Fed. Rep. of Germany ....... 3422204
Jun. 15, 1984 [DE] Fed. Rep. of Germany ....... 3422198

[51] Int. Cl.$^4$ ................................................ F16T 1/02
[52] U.S. Cl. ...................................... 236/56; 137/184; 137/614.18; 137/630.22
[58] Field of Search ................ 236/56, 58, 93 A, 99 J, 236/99 R; 137/183, 184, 614.11, 614.18, 630.22

[56] References Cited

U.S. PATENT DOCUMENTS

| | | | |
|---|---|---|---|
| 1,076,159 | 10/1913 | Schutt | 236/58 |
| 2,260,789 | 10/1941 | Richter | 137/184 |
| 2,790,456 | 4/1957 | Shaw et al. | 137/184 |
| 3,194,268 | 7/1965 | Vicenzi et al. | 137/614.11 |
| 3,425,450 | 2/1969 | Pawling | 137/630.22 |
| 3,513,880 | 5/1970 | White | 137/630.22 |
| 4,441,652 | 4/1984 | Minami | 236/56 |

*Primary Examiner*—William E. Tapolcai
*Attorney, Agent, or Firm*—Collard, Roe & Galgano

[57] ABSTRACT

There is provided a steam trap having a thermal control element arranged on the high-pressure side containing an expanding medium and a shut-off unit closing in the direction of flow. The shut-off unit includes two closure members and two valve seats forming two series-connected, independent sealing units, which are opened or closed one after the other in series fashion by the control element so as to reduce wear of the shut-off unit. The two sealing units are arranged in a single assembly which is coupled to the control element for ease of installation.

13 Claims, 5 Drawing Figures

STEAM TRAP WITH THERMAL CONTROL ELEMENT AND METHOD OF ASSEMBLING SAID TRAP

The present invention relates to a steam trap and, more particularly, to a steam trap having a thermal control element containing an expanding medium which is disposed on the high pressure side and a shut-off unit closing in the direction of condensate flow.

Known steam traps make use of an expanding medium having a vapor pressure equal to or slightly greater than the vapor pressure of water. Thus, when the condensate surrounding the control element cools to below the boiling point, the interior pressure of the control element immediately drops, causing the steam trap to open. Accordingly, such steam traps respond very rapidly. On the other hand, such steam traps generate relatively low sealing forces due to the fact that the interior pressure of the control element is equal to or only slightly greater than the ambient pressure. As a rule, the closing elements or parts of such steam traps are spherical, conical or plate-shaped elements which are adapted to seal against a seat surface of the valve seat element in the presence of saturated steam. When steam acts on the steam trap or if only a small amount of condensate is collected and because of the slight drop in temperature and the resulting slight reduction in the sealing force produced by the control element, the closing member will maintain a quasi closed postion, which means that the total pressure gradient is reduced on the surface of the valve seat. This leads to wear on the sealing unit after a short time, so that steam losses are unavoidable after a relatively short period of operation.

Furthermore, steam traps are known in which the shut-off unit, in addition to the valve seat, has a narrow throttling gap differently located when the unit is in the closed position, said gap increasing with the opening stroke of the closing member. A chamber is formed between the valve seat and the throttling gap, the condensate passing through said chamber.

In one design of such a steam trap, which, however, is provided with a bimetallic control element and a shut-off unit disposed on the low pressure side (DE-PS No. 12 36 292), the shut-off unit is adapted to open wide after completing a minimum displacement. Within the quantitative range required for such device, this operation causes a reduction of the pressure drop on the valve seat and thus reduced wear.

In another design having a rigid thermal control element (GB-PS No. 10 724—A.D. 1903) and a shut-off unit with an additional throttling gap, the full opening effect is initiated only after a minimum stroke or displacement has occurred. However, no movement of the control element occurs until this minimum displacement is accomplished.

With another more recent design comprising a bellows-like control element (DE-PS No. 15 50 263), the arrangement of additional throttling points is adapted to produce a dynamic pressure after the shut-off unit has opened, for the purpose of avoiding vibrations of the control element and increasing the service life thereof.

The common feature of these three designs is that in the closed position and with small strokes, the total pressure drop is reduced on the valve seat. The pressure drop occurring on the valve seat is reduced only with large strokes and, accordingly, large amounts of condensate. Thus, the drawbacks mentioned above are not eliminated when small amounts of condensate are involved. Since the operating limits of many steam traps include small amounts of condensate, an improvement with respect to the discharge of such small amounts without loss is highly significant in practical applications.

It is, therefore, a primary object of the present invention to provide a steam trap that remains largely free of wear on the valve seat particularly when acted upon by steam and when draining small amounts of condensate.

This object is accomplished according to the present invention by providing a steam trap wherein the cut-off between the high and low pressure sides is achieved by means of two series-connected independent sealing units. During the opening operation, the reduction of sealing force takes place initially only on the upstream sealing unit, whereas the downstream sealing unit remains closed with its full sealing force. As condensate flow occurs during the course of the opening operation in the first sealing unit, the sealing force, and thus the tightness of the second sealing unit, increases so that condensate flow past the steam trap does not develop. During this opening of the first sealing unit and consequent condensate flow, an additional opening force is produced on the control element which leads to an intermittent mode of operation of the steam trap even with the smallest amounts of condensate. Consequently, erosions are largely prevented.

The sealing pressure of the second closing member can be influenced in relation to the first member by means of slightly pretensioned springs. In this way, a particularly good adjustment of the movements of the sealing units relative to the dynamic properties of the control element is possible.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

Figure 1:
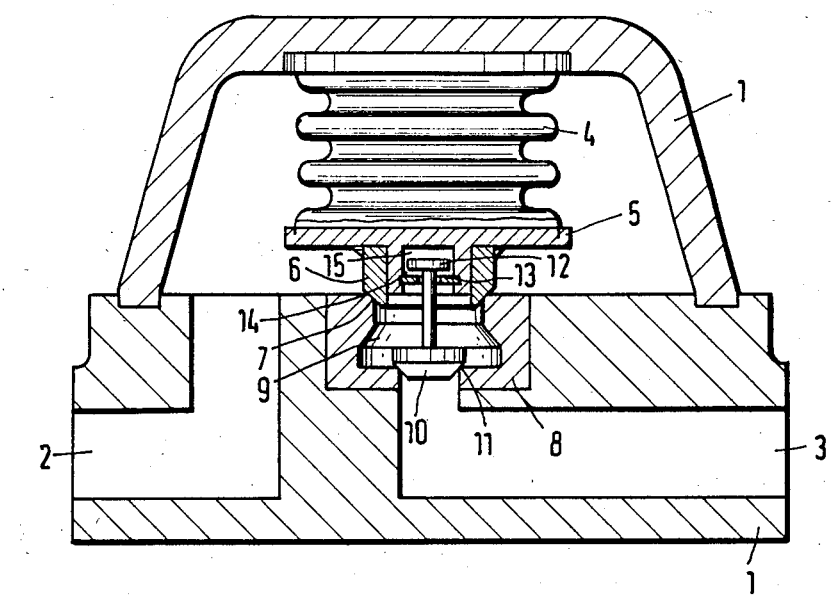
FIG. 1 is a cross-sectional view of a closed condensate draining device according to the present invention.

Now turning to the drawings, there is shown in FIG. 1 a steam trap housing, generally designated 1, having an inlet channel 2, an outlet channel 3 and a thermal control element 4. Thermal control element 4 is disposed on the high-pressure side and contains an expanding medium. A first tubularly shaped closure member 6 is secured to and sealed on a wall part 5 of control element 4 which moves with the stroke of the control element. Closure member 6, which is also disposed on the high-pressure side, is sealed in its closed position on a first valve seat 7 of valve seat body 8. Downstream from the first closure member, a second closure member 10 is disposed in a chamber 9 of valve seat body 8. Closure member 10 cooperates with a second valve seat 11 of valve seat body 8 and supports an opening driver 12. On its face side averted from control element 4, driver 12 is associated with a stop 13 which extends below wall part 5 of control element 4. In the closed position of the two closure members 6 and 10, clearances 14 and 15 are provided, respectively, between stop 13 and driver 12 and between the opposite face side of driver 12 and wall part 5, said clearances amounting to a fraction of the working stroke of control element 4.

When steam flows into steam trap housing 1 by way of inlet 2, control element 4 is moved into the closed position shown in FIG. 1. The pressure so applied is reduced not only on one sealing unit, as is the case with conventional steam traps, but on the existing two sealing units 6, 7 and 10, 11. When the smallest amounts of condensate flow into the steam trap at boiling temperature, control element 4 initially maintains the closed position. The condensate and the control element gradually cool off, which causes a force acting in the opening direction to be applied first only to closure member 6, so that its sealing pressure acting on valve seat 7 is reduced. Consequently, condensate leaking or flow occurs at sealing unit 6, 7. Now, if said leakage is quasi in balance with the low dissipation of heat of small amounts of condensate flowing in, the steam trap, without the presence of the second sealing unit 10, 11, would stay in this leaking position, and the damage to this valve element indicated above would occur. However, in chamber 9, the pressure instead rises to a value exceeding the one that prevailed when closing member 6 was still sealing with full force. This provides closing member 10 with a greater sealing pressure, causing sealing unit 10, 11 to seal tighter. Consequently, the intermediate pressure in chamber 9 rises further. Said intermediate pressure in turn has an opening effect on control element 4, causing said element to further reduce the sealing pressure of closure member 6. This causes the wall part 5 of control element 4 to perform an opening stroke, exploiting clearance 14, until said part 5 eventually opens closure member 10 by means of stop 13 and opening driver 12. During this action, closure member 6 has moved away from its valve seat 7 far enough to eliminate any erosion effects due to the condensate flow occurring on valve seat 7.

After the condensate has been drained, the temperature acting on control element 4 rises, whereupon the steam trap closes, causing first closure member 10 to come to rest on its valve seat 11 and only thereafter closure member 6 to come to rest on its valve seat 7.

By virtue of the design of the steam trap according to the present invention, it is possible for the first time to reduce the pressure drop on valve seats 7 and 11 even in the presence of the smallest amounts of condensate and to simultaneously achieve a spontaneous wide opening or an intermittent mode of operation. In this manner, wear is prevented on sealing units 6, 7 and 10, 11 for an extended period of time even within this condensate quantity range.

Figure 2:
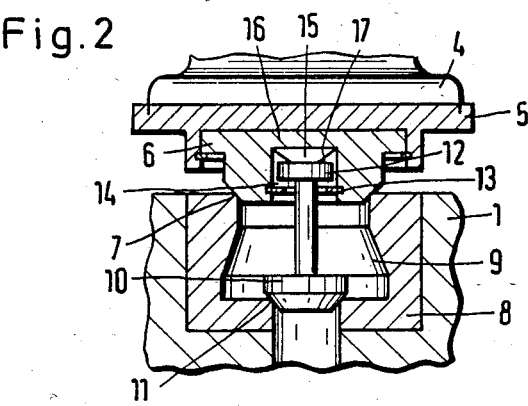
FIG. 2 is another embodiment of the shut-off unit of the condensate draining device of FIG. 1 in the closed position.
Figure 3:
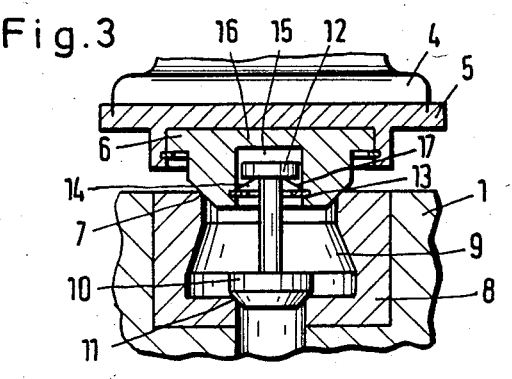
FIG. 3 is still another embodiment of the shut-off unit of the condensate draining device of FIG. 1 in the closed postion.

With the embodiments according to FIGS. 2 and 3, the first closure member 6 is closed by base plate 16 at the end of member 6 disposed on the side of the control element. Furthermore, first closure member 6 supports stop 13 for second closure member 10. Thus, the two closure members 6 and 10 form an assembly which is secured on moving wall part 5 of control element 4 as a completely preassembled unit. Because base plate 16 is provided on closure member 6, no pressure-tight securing of member 6 is required.

In FIG. 2, a spring 17 is disposed between base plate 16 and opening driver 12, whereas in FIG. 3, spring 17 is disposed between opening driver 12 and stop 13. The mode of operation of the two embodiments according to FIGS. 2 and 3 is identical and as described in connection with the embodiment of FIG. 1. The sealing pressure of the second closure member 10 is increased by the slightly pretensioned spring 17 shown in FIG. 2 as compared to the sealing pressure of closure member 6 while member 10 is in the closed position, whereas spring 17 according to FIG. 3 has the reverse effect. In this way, the pressure drop at the two sealing units 6, 7 and 10, 11 can be influenced in a controlled manner particularly during the phase of sealing force reduction, permitting in this way a control over the rate at which control element 4 opens. Consequently, the movements of the closure members can be well adapted to the dynamic properties of control element 4.

As can be appreciated, the second and smaller of the two closure members includes a pin 31 with a head as opening driver 32. This element, with its simple structure, poses no problems in terms of manufacturing technology since the diameter of the pin 31 is adapted to the diameter of valve seat 11, i.e. the diameter of the pin 31 is as large as possible. Thus, very small part dimensions and the danger of deformation associated therewith are avoided.

Figure 4:
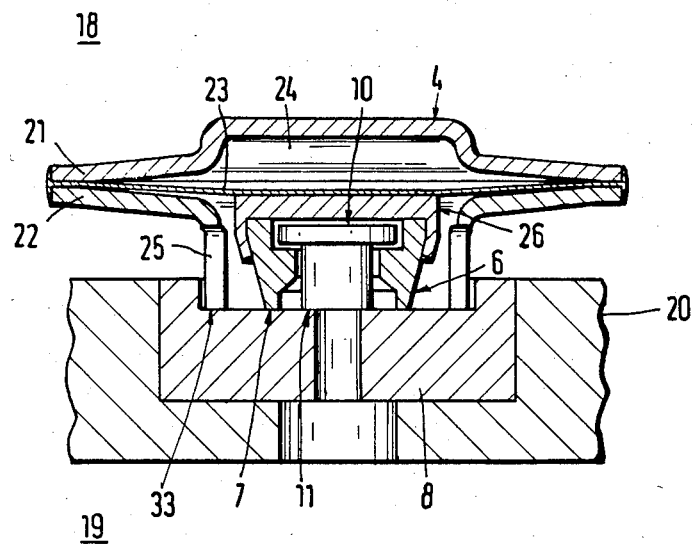
FIG. 4 is another embodiment of the control unit of the condensate draining device according to the invention in the closed position.
Figure 5:
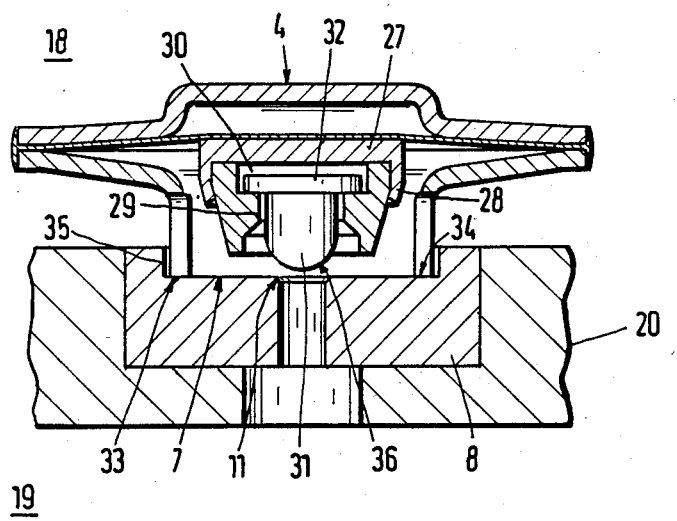
FIG. 5 is still another embodiment of the control unit of the condensate draining device according to the invention in the open position.

In FIGS. 4 and 5, separating wall 20 of housing 1 provided between the high-pressure side 18 and the low-pressure side 19 supports valve seat body 8. Thermal control element 4 is disposed on high-pressure side 18 and has a flat design, comprising two dish-shaped, rigid wall parts 21 and 22. Membrane 23 serves as a moving wall part which is driven by the stroke of control element 4 and is disposed between said two wall parts 21 and 22. Upper wall part 21 and membrane 23 jointly form a receiving space 24 therebetween for accommodating the expanding medium, whereas lower wall portion 22 is provided with support element 25 for securing control element 4 on valve seat body 8.

On its side facing valve seat body 8, membrane 23 supports a closure member support 26 having a bottom 27 and a side wall 28 extending fully around bottom 27. First closure member 6 is supported in closure member support 26 and cooperates with first valve seat 7 on valve seat body 8. Said closure member 6 has a central through-extending bore 29 having an annular recess 30 at its end facing bottom 27 of support 26. The second closure member 10 is in the shape of a pin 31 extending through through-extending bore 29 of closure member 6. At its end disposed at annular recess 30 of bore 29, closure member 10 is provided with a radially projecting head 32. The shoulder formed between annular recess 30 and bore 29 performs the function of and is comparable to stop 13 of Figs. 1–3.

In FIG. 4, each of the two closure members 6 and 10 is provided on its operating end face with a flat sealing surface. Valve seat body 8 has a planar surface functioning in three concentric annular zones as a flat valve seat 11 for the second closure member 10, as a flat valve seat 7 for the first closure member 6 and, moreover, peripherally as a support surface 33 for the end face positioning surface 34 of support element 25 of control element 4. Said support element 25 is radially resilient and may be comprised of four arms which extend about the periphery of closure members 6 and 10 from wall part 22 of control element 4 to support surface 33 of valve seat body 8. Over a portion of their length, said arms are surrounded by a circularly extending wall part or shoulder 35 of valve seat body 8, and rest against said wall part 35 with a clamping effect because of their radial resiliency. In this way, control element 4 is supported on the valve seat body 8 in a simple manner.

As clearly seen in FIG. 4, since the two valve seats 7 and 11 and also the support surface 33 are disposed on one plane, there are no vertical tolerances. Consequently, no such vertical tolerances need be taken into account in the relative stroke of closure member 6 with respect to closure member 10. Thus, a particularly large proportion of the possible working stroke of membrane 23 can be to the advantage of the stroke of closure member 10 to thereby contribute to increasing the flow rate. This is advantageous in particular with flat and thus short-stroke control elements.

The embodiment according to FIG. 5 differs from that shown in FIG. 4 in that valve seat 11 is tapered or conically shaped and the sealing surface 36 of closure member 10 is ball shaped. Thus, said two elements are tapered in the direction of flow. Of course, valve seat 11 may also be spherically shaped, concave or convex as desired. Since valve seat 11 discharges on the plane of valve seat 7 and the support surface 33, all three surfaces 7, 11 and 33 can be formed in a single cutting operation, for example on a numerically controlled (NC) machine tool. This means that in this instance also, vertical tolerances between the two valve seats 7 and 11 are not required, including the supporting surface 33.

In FIGS. 4 and 5, the two closure members 6 and 10 and the closure member support 26 form a single unit, which is assembled as follows:

First, second closure member 10 is inserted into bore 29 of closure member 6 with its pin 31 extending from annular recess 30. Head 32 of pin 31 is accommodated in annular recess 30. Subsequently, closure member support 26 is plugged with its lateral wall 28 over first closure member 6 until bottom 27 firmly rests on said member 6. The design of the circumferential surface of closure member 6 is partially conical with the diameter tapered in the direction of valve seat 7. The lateral wall 28 of closure member support 26, which, for example, initially was cylindrical, is now by plastic deformation (by application of pressure or rolling) conformed with the smaller part of the peripheral surface of closure member 6, i.e., the part having the smaller diameter. In this manner, said closure member 6 is solidly and tightly combined with closure member support 26.

The unit 6, 10, 26 so assembled may then be secured on membrane 23 in a suitable way, for example by welding.

Even if designed for a low rate of flow, the size of the parts of the assembly 6, 10, 26 is still such that said parts may be manufactured and mounted without problems using conventional manufacturing equipment. Extremely small sizes and the hazard of deformation inherent with such small sizes are avoided even for the smallest of the three elements, namely second closure member 10.

Furthermore, the division into various parts, namely closure member support 26 and first closure member 6, has the advantage that said two parts can be exactly adapted to the various requirements with respect to the material used for making said parts. Preferably, the first closure member may be made of a material with particularly high resistance to wear, whereas support 26 for the closure member may be manufactured, for example from a material suitable for connecting (e.g. by welding) said support with the moving part of the control element. Also, the particularly simple manner of supporting the first closure member 6 in closure member support 26 in a form-locking manner requires no additional connecting parts or elements.

The mode of operation of the embodiments shown in FIGS. 4 and 5 is the same as with the design described for FIG. 1.

While only a few embodiments of the present invention have been shown and described, it will be obvious that many changes and modifications may be made thereunto without departing from the spirit and scope of the invention.

What is claimed is:

1. A method of assembling a steam trap which is comprised of a thermal control element containing an expanding medium arranged on the high pressure side and a shut-off unit closing in the direction of flow, said shut-off unit including two valve seats arranged in the direction of condensate flow, a first closure member associated with the first valve seat in the direction of flow having a through-extending bore with an annular recess therein at the end of said closure member removed from said first valve seat defining a stop in said bore, said first closure member having a peripheral surface including at least two zones of different diameters, a second closure member comprising a pin substantially conforming to the diameter of the second valve seat in the direction of flow and associated therewith, said pin extending through said through-extending bore of said first closure member and having a radially projecting head forming an opening driver received in said annular recess of said bore at the end thereof removed from said second valve seat, said pin having a sealing surface cooperating with said second valve seat, said head of said second closure member cooperating with the stop in said through-extending bore of said first closure member to actuate said second closure member and separated therefrom to form an axial clearance therebetween, and a closure member support having a bottom wall connected to said control element and a lateral wall extending fully around said bottom wall and engaging the zones of the peripheral surface of said first closure member to sealingly support said first closure member, said method comprising the steps of:
inserting said second closure member in the through-extending bore of said first closure member from the end thereof having the annular recess therein; and
plugging said lateral wall of said closure member over the peripheral surface of said first closure member so that said lateral wall of said closure member engages the peripheral surface of said first closure member by plastic deformation.

2. In a steam trap having a thermal control element containing an expanding medium arranged on the high-pressure side, and a shut-off unit closing in the direction of condensate flow, the improvement comprising said shut-off unit including at least two series-connected sealing units sealing in the direction of condensate flow, each sealing unit comprising a valve seat and a closure member associated with said valve seat, said valve seats being formed on a single valve seat body, the first closure member in the direction of flow being coupled with the thermal control element and the second closure member in the direction of flow further including an opening driver actuated by a stop associated with said control element, said opening driver and said stop being separated by an axial clearance so that the movement of said control element is first taken up by said clearance before actuation of said second closure member, said thermal control element including a support means extending up to said valve seat body and having a positioning surface, and said valve seat body having a support surface for the positioning surface of said support means.

3. The steam trap as defined in claim 2, which further includes biasing means biasing the opening driver of said second closure member toward said stop.

4. The steam trap as defined in claim 2, which further includes biasing means biasing said opening driver of said second closure member away from said stop.

5. The steam trap as defined in claim 2, wherein said two valve seats are disposed on one plane on said valve seat body.

6. The steam trap as defined in claim 5, wherein said two valve seats are formed as flat seats disposed on one plane.

7. The steam trap as defined in claim 5, wherein one valve seat is a flat seat and the other valve seat is formed with a tapered surface tapering from the plane of said flat valve seat.

8. The steam trap as defined in claim 5, wherein said support surface of said valve seat body is arranged in the plane of said two valve seats.

9. The steam trap as defined in claim 2, wherein said support means is radially resilient and said valve seat body includes a wall part radially surrounding said support means.

10. In a steam trap having a thermal control element containing an expanding medium arranged on the high-pressure side, and a shut-off unit closing in the direction of condensate flow, the improvement comprising said shut-off unit including at least two series-connected sealing units sealing in the direction of condensate flow, each sealing unit comprising a valve seat and a closure member associated with said valve seat, the first closure member in the direction of flow being coupled with the thermal control element and the second closure member in the direction of flow further including an opening driver actuated by a stop associated with said control element, said opening driver and said stop being separated by an axial clearance so that the movement of said control element is first taken up by said clearance before actuation of said second closure member, and a closure member support for coupling said first closure member to said thermal control element, said closure member support having a bottom wall and a lateral wall extending fully around said bottom wall, said closure member support being connected to said control element at said bottom wall thereof and said first closure member being sealingly supported in said closure member support at its end removed from the valve seat associated therewith, said first closure member having a through-extending central bore with an annular recess at its end facing the bottom wall of said closure member support, and said second closure member comprising a pin substantially conforming to the diameter of the valve seat associated with said second closure member, said pin extending through said through-extending bore of said first closure member and having a radially projecting head forming said opening driver received in said annular recess of said bore, and at its other end, said pin having a sealing surface cooperating with the valve seat associated therewith.

11. The steam trap as defined in claim 10, wherein said first closure member includes a peripheral surface which has at least two zones of different diameters, and the lateral wall of said closure member support engages with said zones.

12. The steam trap as defined in claim 10, which further includes biasing means biasing the opening driver of said second closure member toward said stop.

13. The steam trap as defined in claim 10, which further includes biasing means biasing said opening driver of said second closure member away from said stop.

* * * * *